United States Patent
West et al.

[11] Patent Number: 6,058,462
[45] Date of Patent: May 2, 2000

[54] METHOD AND APPARATUS FOR ENABLING TRANSFER OF COMPRESSED DATA RECORD TRACKS WITH CRC CHECKING

[75] Inventors: Christopher James West; David Glenn Hostetter; Michael Richard Crater, all of Boulder; Steven Christopher Fraioli, Arvada, all of Colo.

[73] Assignee: International Business Machines Corporation, Armonk, N.Y.

[21] Appl. No.: 09/012,496

[22] Filed: Jan. 23, 1998

[51] Int. Cl.[7] .............................. G06F 13/14; G06F 11/00
[52] U.S. Cl. ........................ 711/162; 711/112; 714/799; 714/807
[58] Field of Search ..................... 711/112, 113, 711/162; 714/6, 752, 758, 799, 807

[56] References Cited

U.S. PATENT DOCUMENTS

| | | | |
|---|---|---|---|
| 4,375,655 | 3/1983 | Korth et al. | 360/15 |
| 4,380,047 | 4/1983 | Eisenhard et al. | 386/125 |
| 4,494,156 | 1/1985 | Kadison et al. | 360/48 |
| 4,541,019 | 9/1985 | Precourt | 360/15 |
| 4,623,963 | 11/1986 | Phillips | 395/712 |
| 5,247,646 | 9/1993 | Osterlund et al. | 710/68 |
| 5,272,691 | 12/1993 | Watanabe | 369/124 |
| 5,392,445 | 2/1995 | Takamoto et al. | 711/114 |
| 5,574,952 | 11/1996 | Brady et al. | 710/68 |
| 5,606,706 | 2/1997 | Takamoto et al. | 711/100 |
| 5,630,092 | 5/1997 | Carreiro et al. | 711/111 |
| 5,742,792 | 4/1998 | Yanai et al. | 714/6 X |
| 5,787,485 | 7/1998 | V et al. | 711/112 X |
| 5,867,733 | 2/1999 | Meyer | 711/112 X |

*Primary Examiner*—David L. Robertson
*Attorney, Agent, or Firm*—Ohlandt, Greeley, Ruggiero & Perle

[57] ABSTRACT

A system incorporating the invention stores data on communicating disk drives in such a manner as to enable recovery of the data in the event a failure of one of the disk drives. The system includes a first disk drive and a second disk drive, both for storing compressed data records in compressed track formats. Each compressed data record includes a CRC value. A cache stores compressed tracks of data records that are read from the first disk drive and a CRC value is calculated for each stored track of compressed data records. That CRC value is appended to the compressed track. A switch is coupled between the cache, a host processor and the second disk drive for dispatching and receiving tracks of compressed data records between the first disk drive and the second disk drive. The switch includes computational circuitry for calculating a CRC value for each track of compressed data records received from the cache and for determining a match or non-match state with the CRC value appended to each track of compressed data records. In such manner, a system which is primarily adapted to handle records with appended CRC values is adapted to handle tracks of compressed data records with appended CRC values so as to assure data integrity.

5 Claims, 1 Drawing Sheet

METHOD AND APPARATUS FOR ENABLING TRANSFER OF COMPRESSED DATA RECORD TRACKS WITH CRC CHECKING

FIELD OF THE INVENTION

This invention relates to disk storage system management and, more particularly, to a system and method for transfer of tracks of compressed data between disk drives, wherein Cyclic Redundancy Check (CRC) characters are employed to assure data integrity of the tracks of compressed data.

BACKGROUND OF THE INVENTION

Certain disk drive storage systems are configured in a log-structured manner wherein data is recorded in a compressed record format. A log structured disk controller does not perform data record writes in place, but instead writes each data record to a new disk location that was previously empty. Thus, each write or update of data causes the data to be written to new physical locations. The previous physical locations of the data are subsequently "garbage" collected and reused for future writes. In a log structured disk controller, a directory is maintained to map the addresses used by the system to the physical addresses at which the data is actually stored.

In general, when reading a record from a disk drive, wherein each track includes compressed data records in a log-structured system, the entire track is read, the addressed record is accessed, decompressed and buffered for use by a host processor. In the decompression/selection action, a CRC character that was originally appended to the record is retrieved and a CRC character is calculated from the decompressed record. If the two CRC values match, the procedure continues with the knowledge that the record data was not corrupted.

In general, there is no CRC value stored which corresponds to a full track of data. Accordingly, log-structured disk controllers are generally set to only check for individual record CRC values.

In order to maintain data integrity in the event of a malfunction, the prior art includes a number of methods for enabling data recovery. One such method is termed "mirroring" wherein a second copy of updated data is copied to a backup disk. Many installations use on-the-fly creation of backup copies for critical databases. The backup copies are often physically removed from the primary disk drive. This process is also referred to as "extended distance dual copy".

The implementation of a mirroring system, such as an extended distance dual copy, requires substantial amounts of data communication between the primary and backup disk drives, even when the data on the primary disk drive is stored in compressed form. For instance, in U.S. Pat. No. 5,630,092 to Carriero et al., assigned to the same Assignee as this application, a system and method are described wherein data records are mirrored between first and second disk drive systems. In both of the disk drive systems, the data is stored in compressed format and is transferred in compressed format therebetween. However, to accommodate a situation wherein compression actually creates an increase in the size of a data record, certain data is maintained in non-compressed form. To enable identification of the compressed/non-compressed states of the individual data records, meta-data values are attached to the records which indicate their compressed/non-compressed state. Thus, Carriero et al. are able implement a mirrored disk drive system wherein backup data transfer times are minimized through the transfer of minimal size data records.

When performing a mirroring action, such as taught by Carriero et al., a data integrity issue is raised due to the fact that full tracks are accessed and transferred without decompression. Accordingly, there is no opportunity to check the individual CRC values stored with the compressed records or to otherwise check the integrity of the overall track during the succeeding transfers between mirroring processing actions.

Accordingly, it is an object of this invention to provide an improved method and apparatus for assuring data integrity during a mirroring operation.

It is another object of this invention to provide a method and apparatus which enables data integrity checks when compressed tracks are handled during a mirroring transfer.

SUMMARY OF THE INVENTION

A system incorporating the invention stores data on communicating disk drives in such a manner as to enable recovery of the data in the event a failure of one of the disk drives. The system includes a first disk drive and a second disk drive, both for storing compressed data records in compressed track formats. Each compressed data record includes a CRC value. A cache stores compressed tracks of data records that are read from the first disk drive and a CRC value is calculated for each stored track of compressed data records. That CRC value is appended to the compressed track. A switch is coupled between the cache, a host processor and the second disk drive for dispatching and receiving tracks of compressed data records between the first disk drive and the second disk drive. The switch includes computational circuitry for calculating a CRC value for each track of compressed data records received from the cache and for determining a match or non-match state with the CRC value appended to each track of compressed data records. In such manner, a system which is primarily adapted to handle records with appended CRC values is adapted to handle tracks of compressed data records with appended CRC values so as to assure data integrity.

BRIEF DESCRIPTION OF THE DRAWINGS

The FIGURE is a block diagram of a system incorporating the invention.

DETAILED DESCRIPTION OF THE PREFERRED EMBODIMENT

Figure 1:
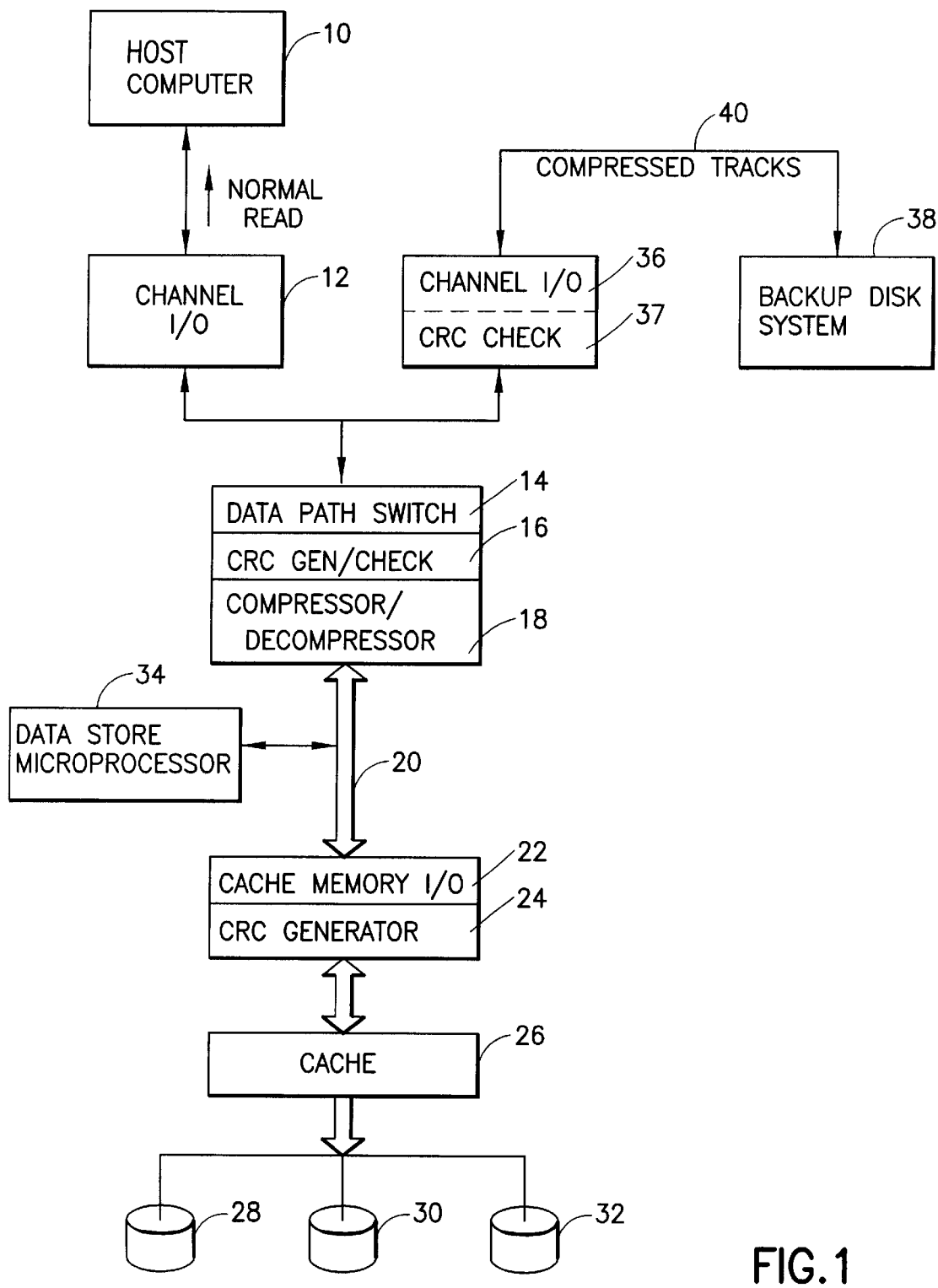

In the FIGURE, a host processor 10 is coupled via a channel input/output (I/O) module 12 to a data path switch 14. Data path switch 14 includes a CRC generator/checking module 16 and a compressor/decompressor module 18. A bus 20 couples data path switch 14 to a cache memory input/output module 22 which further includes a CRC generator module 24. A cache memory 26 is utilized to buffer data flowing into and out of a plurality of disk drives 28, 30, 32, etc. A data store microprocessor 34 (i) controls the flow of data between data path switch 14 and the various disk drives 28, 30 and 32 and (ii) selectively enables and disables operation of compression/decompression module 18 and CRC generator module 24.

Also coupled to data path switch 14 is a channel I/O module 36 which is coupled, via bus 40, to a backup disk system 38 that is used during data mirroring operations. As will be described hereinafter, channel I/O module 36 is utilized to feed tracks of compressed data to backup disk system 38 during a mirroring operation. Such tracks of compressed data are transferred in compressed form and are stored on backup disk system 38 in compressed form to reduce the amount of time required to perform the mirroring task.

Initially, during a write operation, host processor 10 transmits a record to be written through channel I/O module 12 to data path switch 14. There, a CRC value is generated for each incoming record and the resulting CRC value is appended to the respective record. Then, the record, with appended CRC, is compressed by compressor/decompressor 18 and, under control of data-store microprocessor 34, is transferred to cache memory I/O module 22. The compressed record is then written to cache 26 and thereafter written to one of disk drives 28, 30, 32, etc.

During a non-backup read operation, CRC generator module 24 is turned off. A track which includes the compressed record is retrieved from one of the disk drives. The track of compressed data is written to cache 26 and thereafter is forwarded to data path switch 14. There, the compressed track is decompressed by compressor/decompressor module 18 and the desired record is retrieved. The record's CRC value, which is decompressed along with the remainder of the record is checked against a newly calculated CRC value for the entire decompressed record. Assuming a match is found, the decompressed record is then transferred via channel I/O module 12 to host processor 10.

During a backup operation, i.e., wherein mirror writes are performed to backup disk system 38, one or more entire tracks are transferred from disk drives 28, 30, 32 . . . to backup disk system 38. However, since only the compressed records in each track contain CRC values, the invention provides means for enabling a CRC value to be appended to each track, as a whole, so as to assure integrity of the data contained therein, during the various transfers which occur during the mirroring action. Accordingly, CRC generator 24 is turned on by data store microprocessor 34. Then, data store microprocessor 34, in response to a backup command from host processor 10, causes the tracks which are to be backed up, to be read from disk drives 28, 30, 32 into cache 26. The compressed records are written into cache 26 so as to enable full tracks of compressed records to be assembled. As each track is assembled, the respective track of compressed data is fed to CRC generator 24 which calculates a CRC value for the entire track and appends that value in uncompressed form.

Then, cache memory I/O 22 causes the compressed track with appended CRC value, to be transferred to data path switch 14. There, compressor/decompressor module 18 is turned off. However, CRC generator/checking module 16 is activated to calculate a CRC value for the received track. The calculated CRC value is checked against the value that was appended to the track by CRC generator 24. Assuming a match is found, data path switch 14 transfers the track of compressed records, with appended CRC value, to channel I/O module 36 wherein the CRC appended value is again checker by a CRC check procedure 37 that is housed therein.

Assuming a match is found, the track of compressed records is transferred to backup disk system 38 via bus 40 for storage in its compressed format. The CRC value appended to the track may be stripped at channel I/O module 36 if bus 40 which connects channel I/O module 36 to backup disk system 38 includes other data integrity encoding schemes.

Accordingly, the invention enables host processor 10 to handle both record-formatted data which includes integral CRC values and also tracks of compressed data which have no appended CRC values when they are accumulated in cache 26. By appropriate control of CRC generator module 24 and compressor/decompressor module 18, the compressed track data is protected by appended CRC values during the backup operation.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A system for storing data on communicating disk drives, comprising:

first disk drive means and second disk drive means, both for storing compressed data records in compressed track format, each compressed data record including a cyclic redundancy check (CRC) value;

cache means for storing tracks of compressed data records from said first disk drive means and including means for generating a CRC value for each stored track of compressed data records and appending a corresponding CRC value thereto;

a host processor;

switch means coupled between said cache means, said host processor and said second disk drive means for dispatching and receiving tracks of compressed data records between said first disk drive means and second disk drive means; and computational means associated with said switch means for calculating a CRC value for each track of compressed data records received from said cache means and for determining a match/non-match state with the CRC value appended to said each track of compressed data records.

2. The system as recited in claim 1, wherein said computational means further decompresses a track of compressed data records which are to be dispatched to said host processor, calculates a CRC value for each decompressed data record and determines a match/non-match state with the CRC value appended to said decompressed data record.

3. The system as recited in claim 1, wherein said system further includes means for writing said compressed tracks of data records to both said first disk drive means and second disk drive means so as to enable said second disk drive means to act as backup storage for data stored in said first disk drive means.

4. The system as recited in claim 1, further comprising:

processor means for disabling said means for generating a CRC value when a record that is read from said first disk drive means is to be decompressed and fed to said host processor.

5. The system as recited in claim 4, wherein said processor means further disables said computational means when a record that is read from said first disk drive means is to be decompressed and fed to said host processor.

* * * * *